(No Model.)
C. H. CHAPMAN.
METHOD OF MAKING SHELL SPINDLES.
No. 244,548. Patented July 19, 1881.
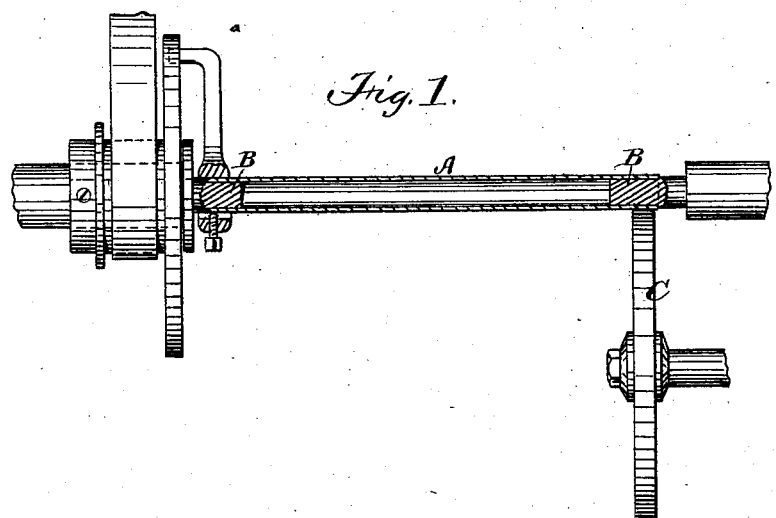
Fig. 1.
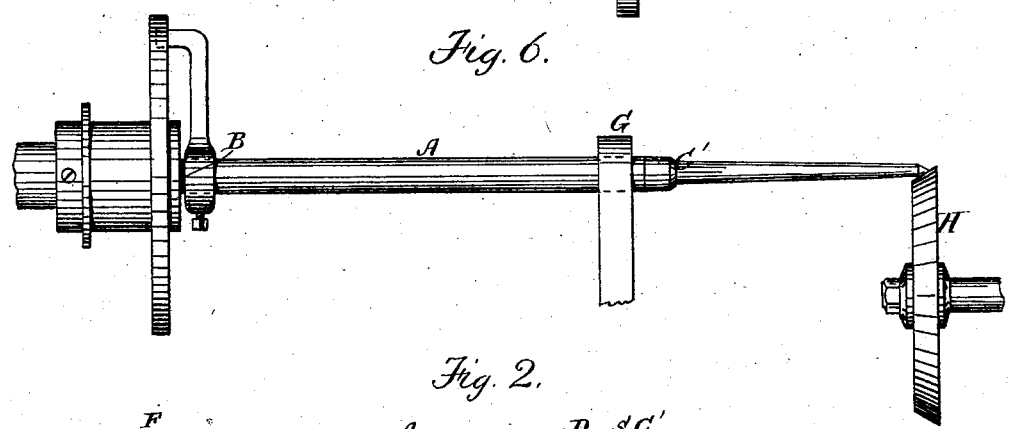
Fig. 6.
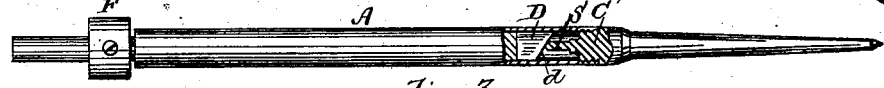
Fig. 2.
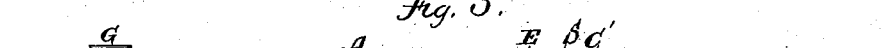
Fig. 3.
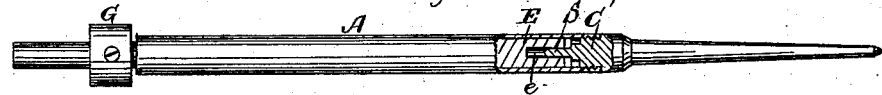
Fig. 4.     Fig. 4.ª
Fig. 5.     Fig. 5.ª
Witnesses.     Fig. 6.ª     Inventor.
Sarah R. Mead                 C. H. Chapman.
L. H. Brown                   by Knight Brown
                                              Attys.

UNITED STATES PATENT OFFICE.

CHARLES H. CHAPMAN, OF SHIRLEY, ASSIGNOR TO THE STANDARD SPINDLE COMPANY, OF AYER, MASSACHUSETTS.

METHOD OF MAKING SHELL-SPINDLES.

SPECIFICATION forming part of Letters Patent No. 244,548, dated July 19, 1881.

Application filed September 27, 1880. (No model.)

*To all whom it may concern:*

Be it known that I, CHARLES H. CHAPMAN, of Shirley, in the county of Middlesex and State of Massachusetts, have invented certain Improvements in the Method of Making Shell-Spindles, of which the following is a specification.

This invention relates to spinning-machine spindles composed of a hollow cylindrical shell to receive a dead spindle or standard, a pivot in the interior of the shell at one end to run on the end of the standard, and a tip to receive the bobbin.

In the manufacture of spindles of this class great difficulty has been experienced in securing the following results: first, making the outer surface of the shell true and concentric with the bore or inner surface; second, locating the point of the pivot in the exact longitudinal center of the shell and making the pivot exactly concentric with the outer and inner surfaces of the shell; and, third, locating the point of the tip in line with the pivot and in the exact longitudinal center of the shell. Unless all these results are attained the spindle will not run steadily and is useless, and because by all methods of manufacture heretofore in use it has been impossible to secure said results with any degree of uniformity, the shell-spindle, although inherently the best spindle in existence, has been condemned by spindle-builders, and has failed to come into the extent of use which its merits warrant.

My invention has for its object to so improve the method of manufacturing shell-spindles as to insure the attainment of said results in every spindle manufactured; and to this end it consists in the improvements in the art of making shell-spindles which I will now proceed to describe and claim.

The accompanying drawings, forming a part of this specification, represent the means employed in carrying my invention into effect, and also show the different stages of the operation.

Of said drawings, Figure 1 represents the shell and the means employed for making its outer surface true and concentric with the inner surface. Figs. 2 and 3 represent the operation of pointing and forming the pivot. Figs. 4 and 5 and 4$^a$ and 5$^a$ represent side and end views of the tools employed in pointing and forming the pivot. Fig. 6 represents the operation of pointing the tip of the spindle. Fig. 6$^a$ represents a modification of the means used in providing the spindle with a pivot.

The same letters refer to the same parts in all the figures.

In the drawings, A represents a spindle-shell composed of a cylindrical rod of iron or steel which has been drilled longitudinally from end to end to form a tube.

It is a difficult, if not impossible, matter to form a perfectly straight hole of the length required in a spindle-shell by a drill of the size necessarily used, on account of the tendency of the drill to spring when the hole is bored progressively from end to end, and on account of the difficulty in insuring the coincidence of two holes drilled from opposite ends of the shell, so that no matter how much care is exercised the hole or bore formed is liable to deviate slightly from a straight line; but the deviation is usually so slight that it will not be a defect in the completed spindle, because the fixed standard on which the spindle runs is usually formed to closely fit the bore of the shell only at the lower end of the latter, the entire periphery of the standard, excepting a short portion at its lower end, being reduced, so that it does not touch the walls of the bore.

The upper end of the shell is provided with a pivot which bears upon the upper end of the fixed standard.

After the shell has been drilled its periphery has to be ground to make the periphery concentric with the bore as nearly as possible, and heretofore it has been the custom to drive the shell upon a rotary arbor before grinding the periphery, the grinding being effected while the arbor is being rotated with the shell. Any deviation of the bore of the shell from a straight line now becomes an objection, for since the bore must fit snugly upon the arbor, it follows that the latter, which is, of course, straight, will straighten the bore, and thus slightly spring the shell, so that after the periphery is ground concentric with the bore and the arbor is removed the shell will spring back, so that the bore will resume its former curvature and the periphery will assume the same curvature, so that it will not run true, and is therefore useless, it being difficult, if not impossible, to straighten a shell which is sprung from a straight line. In carrying out my invention I overcome this difficulty by supporting the shell only at its ends by studs B B, having the same axial center inserted into the bore and in contact with only short sections of the latter, so that the shell is not sprung in the least by the studs. The shell is then made to rotate on the studs by any suitable means, and a grinding-wheel, C, which is adapted both to rotate and to move laterally in a line parallel with the axial center of the studs B B, is brought to bear on the periphery of the shell and moved along the same until the entire periphery is ground and made concentric with the portions of the bore resting on the studs B B. Said portions of the bore are the parts that respectively bear upon the lower end of the fixed standard and receive the pivot that bears upon the upper end of the standard; hence it is immaterial whether the periphery of the shell be exactly concentric with the intermediate portions of the bore or not. The grinding of the periphery being completed, a screw-thread is cut in one of the ends of the bore and a tip, C', is screwed into the threaded portion. The inner end of the tip within the shell is then provided with the before-mentioned pivot to run on the upper end of the fixed standard. This pivot (marked S in Figs. 2 and 3) may be formed by either of two operations—viz., by reducing the inner end of the tip with a cylindrical mill, E, having cutting-teeth $e'$ to reduce the tip and form the pivot, and a central cavity, $e$, into which the pivot projects as fast as formed, or by drilling a hole in the end of a tip with a drill, I, having a cylindrical enlargement, I', on its shank concentric with the drill, as shown in Fig. 6$^a$, the pivot being subsequently inserted into the hole thus formed. The mill E and the enlargement I' are of the same diameter, and each is adapted to fit snugly in the bore of the shell, so that it can rotate without wabbling therein. It will be seen that in either case the portion of the bore of the shell against which the mill E or the enlargement I' bears becomes a templet, which determines the location of the pivot and makes the latter necessarily concentric with both the specified portion of the bore and also the periphery of the shell, the templet portion of the bore being the same that rested on one of the studs B during the operation of grinding the periphery. The pivot S is next pointed by a mill, D, having a beveled cutting-edge, $d$, and of the same diameter as the mill E, so that the bore of the shell also acts as a templet for the last-named mill and insures the location of the point of the pivot at the axial center of the periphery of the shell and the portions of the bore concentric with the periphery. This method of construction insures the steady running of the spindle on the standard, as will be readily seen.

The tip C' may be removed from the shell to enable the pivot to be hardened and polished, and, the tip being replaced, the next step in the operation is to find the center of the tip. This is done by placing the end of the shell in which the tip is screwed in a rest or bearing, G, fitting the shell closely, placing the other end of the shell on a stud, B, which has its axial center in line with the center of the rest G and bears upon only one of the portions of the bore of the shell with which the periphery is made concentric, rotating the shell and tip, and applying a beveling-tool, H, to the outer end of the tip while it is rotating. A center or point is thus formed on the outer end of the tip which is exactly in line with the pivot S and with the axial center of the periphery of the shell and the concentric portions of its bore. The body of the tip C' is then ground to the required taper and size, and the spindle is finished.

By the described method a perfectly true spindle is produced, adapted to run with the minimum degree of jarring or vibration. Every spindle produced is necessarily a fac-simile of the others, and no spindle requires straightening or special adjustment after it is finished; hence by my invention I am enabled to produce reliable spindles with rapidity and economy.

I claim—

1. The improved method of grinding spindle-shells, consisting in supporting the ends of the shell on short studs in line with each other and bearing upon short sections of the bore of the shell, positively rotating the shell upon said studs, and grinding the periphery of the shell with a grinding-wheel having a lateral movement in a line parallel with the axial line of the studs, whereby the entire periphery is made concentric with the portions of the bore resting on the studs, as set forth.

2. That improvement in the art of making shell-spindles which consists in making the periphery of the shell concentric with the portions of its bore at the ends of the shell, inserting a tip into one of the above-named portions of the bore, providing the inner end of the tip with a pivot by the use of a tool fitted accurately to the interior of the shell, and pointing the pivot by a tool similarly fitted, the interior of the shell serving as a templet for said tools, so that the pivot necessarily has its axial center and its point in line with the axial center of the periphery of the spindle and the concentric portions of the bore, as set forth.

3. That improvement in the art of making shell-spindles which consists in making the periphery of the shell concentric with the portions of its bore at the ends of the shell by means substantially as described, inserting a tip into one of the above-named portions of the bore of the shell, forming a pivot on the inner end of the tip in line with the axial center of the periphery of the shell, placing the part of the shell into which the tip is inserted in a closely-fitting bearing and the other end of the shell on a stud rotating the shell and tip, and subjecting the point of the tip to a beveling-tool, whereby a center or point is formed on the tip in line with the common axial center of the pivots, the periphery of the shell, and the portions of the bore of the shell which are concentric with the periphery, as set forth.

In testimony whereof I have signed my name to this specification in the presence of two subscribing witnesses.

CHARLES H. CHAPMAN.

Witnesses:
JAMES R. GRAY,
WILLIAM N. COWLES.